United States Patent
Hunt

(10) Patent No.: US 8,485,555 B2
(45) Date of Patent: Jul. 16, 2013

(54) STRUCTURAL JOINT FOR A COMMERCIAL VEHICLE FRAME AND A FRAME MADE WITH A STRUCTURAL JOINT

(75) Inventor: Thomas Steven Hunt, Sophia, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 225 days.

(21) Appl. No.: 13/063,102

(22) PCT Filed: Sep. 12, 2008

(86) PCT No.: PCT/US2008/010693
§ 371 (c)(1),
(2), (4) Date: Mar. 9, 2011

(87) PCT Pub. No.: WO2010/030257
PCT Pub. Date: Mar. 18, 2010

(65) Prior Publication Data
US 2011/0163527 A1 Jul. 7, 2011

(51) Int. Cl.
*B62D 21/00* (2006.01)
(52) U.S. Cl.
USPC ............................ 280/781; 280/785; 180/311
(58) Field of Classification Search
USPC .................. 280/781, 785, 799, 800; 180/311
See application file for complete search history.

(56) References Cited

U.S. PATENT DOCUMENTS

| | | | |
|---|---|---|---|
| 910,510 A | 1/1909 | Davis | |
| 3,968,624 A | 7/1976 | Allmendinger | |
| 4,630,960 A | 12/1986 | Reeves, Jr. | |
| 5,233,799 A * | 8/1993 | Abukawa | 52/86 |
| 5,385,423 A | 1/1995 | Abukawa | |
| 6,398,262 B1 | 6/2002 | Ziech | |
| 6,681,489 B1 * | 1/2004 | Fleming | 29/897.2 |
| 6,905,137 B2 * | 6/2005 | Fowler et al. | 280/781 |

(Continued)

FOREIGN PATENT DOCUMENTS

| CN | 2926005 Y | 7/2007 |
|---|---|---|
| CN | 101092150 A | 12/2007 |

(Continued)

OTHER PUBLICATIONS

Translation summary of office action of corresponding Japan application.

(Continued)

*Primary Examiner* — Joseph Rocca
*Assistant Examiner* — Barry Gooden, Jr.
(74) *Attorney, Agent, or Firm* — Michael Pruden; Martin Farrell

(57) ABSTRACT

A structural joint in a truck tractor frame includes a first frame member having an interface plate permanently mounted thereon, the interface plate having an interface surface contoured with a plurality of protrusions and depressions, which may be grooves and ridges. A second frame member has an interface surface contoured with a plurality of protrusions and depressions complementary to the plurality of protrusions and depressions of the interface surface of the interface plate. The second frame member is mounted to the first frame member with the interface surfaces in contact, with a plurality of releasable fasteners fastening the second frame member to the interface plate, wherein, the contoured interface surfaces interengage to resist linear and torsional shear forces.

16 Claims, 5 Drawing Sheets

U.S. PATENT DOCUMENTS

| | | |
|---|---|---|
| 6,969,321 B2 | 11/2005 | Erlmann |
| 7,156,421 B2 * | 1/2007 | Fowler et al. ................ 280/781 |
| 7,261,322 B2 * | 8/2007 | Ito et al. ...................... 280/781 |
| 7,389,844 B2 * | 6/2008 | Van Der Bijl ................ 180/291 |
| 7,717,498 B2 * | 5/2010 | Fleming ................... 296/203.01 |
| 7,980,594 B2 * | 7/2011 | Hendriks et al. ............. 280/781 |
| 2003/0214155 A1 | 11/2003 | Kiehl |
| 2005/0218644 A1 * | 10/2005 | Fowler et al. ................ 280/781 |
| 2011/0025035 A1 * | 2/2011 | Beuss et al. .................. 280/781 |

FOREIGN PATENT DOCUMENTS

| | | |
|---|---|---|
| FR | 561281 A1 | 8/1923 |
| FR | 2379922 A1 | 10/1978 |
| JP | 2005075018 A | 3/2005 |

OTHER PUBLICATIONS

Translation summary of office action of corresponding China application.

* cited by examiner

STRUCTURAL JOINT FOR A COMMERCIAL VEHICLE FRAME AND A FRAME MADE WITH A STRUCTURAL JOINT

FIELD OF THE INVENTION

The invention relates to vehicle frames such as commercial truck frames, and more particularly, to a joint for frame members and a modular frame assembly incorporating such a joint.

BACKGROUND AND SUMMARY OF THE INVENTION

A typical heavy truck frame includes two elongated frame rails joined by cross members to form a generally rectangular structure. Other components are mounted to or supported by the frame, including the bumpers, the engine and transmission, and the front and rear axles and suspensions.

It would be advantageous to design and make a commercial vehicle frame comprising various structural segments or units, each designed for the load or service demands placed on the commercial vehicle frame. Such an approach allows for improvements in assembly and service, including the use of modular frame units, which can be assembled elsewhere and brought as a unit to the assembly line. In addition, a segment approach allows for the redesign of the frame to decrease weight, which can improve fuel mileage of the vehicle. Moreover, frame segments of various materials and material properties (e.g., stiffness, weight) may be selected, with segments located along the frame's length to achieve an appropriate combination of mass, strength and durability.

Each frame segment, unit, or module within the frame requires at least one structural interface or joint with another segment, unit or module. To be successful, the interface must be structurally secure for joint integrity and durability.

For the purposes of manufacturing efficiency and aftermarket serviceability, it is advantageous if the interface joint is easily assembled and disassembled.

Typically, a structural joint interface in a commercial vehicle frame is assembled with rivets, welds, or bolts and nuts. Rivets and welding are generally considered "permanent" structural joints, as disassembly of such joints involves significant effort and usually to some degree destruction of the joint and/or the fastener system. In structural interface joints in very high loading conditions rivets are heavily favored in the industry. Bolts and nuts, on the other hand, which can be removed without harm to the frame members or fasteners, are not considered permanent, which is an advantage in service and repair and in conversion of a truck frame from one purpose to another. However, bolts and nuts are not usually considered to be as secure as rivets.

The invention provides a system for joining members of a vehicle frame in a highly secure manner while also providing the ability to readily disassemble the joint. A feature of the invention is an interface system that is formed or provided on mating surfaces of the frame components. The interface system includes mating surfaces shaped to interengage to resist linear and rotational shear forces at the mating surfaces of the parts.

A releasable structural joint for frame members in a vehicle, according to an embodiment of the invention includes a first frame member having a first contoured interface surface, a second frame member having a second contoured interface surface complementary to the contoured interface surface of the first frame member, and a plurality of releasable fasteners for releasably fastening the second frame member to the interface plate, wherein, the contoured interface surfaces interengage to resist linear and torsional shear forces.

According to the invention, the contoured interface surfaces of the first frame member and the second frame member each include a plurality of protrusions and depressions. The protrusions and depressions may be formed as bumps and dips in the surface or as ridges and grooves, or as other complementary engaging shapes.

According to one embodiment, the contoured interface surfaces of a first frame member and a second frame member each include at least one ridge and one groove, the at least one ridge on each contoured interface surface aligning with the at least one groove on the other contoured interface surface. More preferably, the contoured interface surfaces each comprise a plurality of parallel ridges and grooves.

The contoured interface surfaces of the first frame member and the second frame member each has a longitudinal direction and may include at least one pair, and preferably a plurality, of ridges and grooves obliquely oriented to the longitudinal direction.

The contoured interface surfaces of the first frame member and the second frame member may each include at least one longitudinally directed ridge and groove and at least one obliquely oriented ridge and groove.

According to another aspect of the invention, the contoured interface surfaces of the interface plate and the contoured interface surface of the second frame member are formed of different materials having different hardness values.

According to yet another aspect of the invention one contoured interface surface is formed on a plate permanently mounted to a frame member.

According to another embodiment, the contoured interface surfaces of the first frame member and the second frame member each include concentrically arranged grooves and ridges and a plurality of linearly arranged grooves and ridges.

According to the invention, a truck frame having a releasable structural joint, includes a first frame member, an interface plate mounted to the first frame member, the interface plate having an interface surface contoured with a plurality of protrusions and depressions, a second frame member mounted to the first frame member, the second frame member having an interface surface contoured with a plurality of protrusions and depressions complementary to the plurality of protrusions and depressions of the interface surface of the interface plate, and, a plurality of releasable fasteners for releasably fastening the second frame member to the interface plate, wherein, the contoured interface surfaces interengage to resist linear and torsional shear forces.

BRIEF DESCRIPTION OF THE DRAWINGS

The invention will be better understood by reference to the following detailed description in conjunction with the appended drawings, in which.

DETAILED DESCRIPTION

Figure 1:
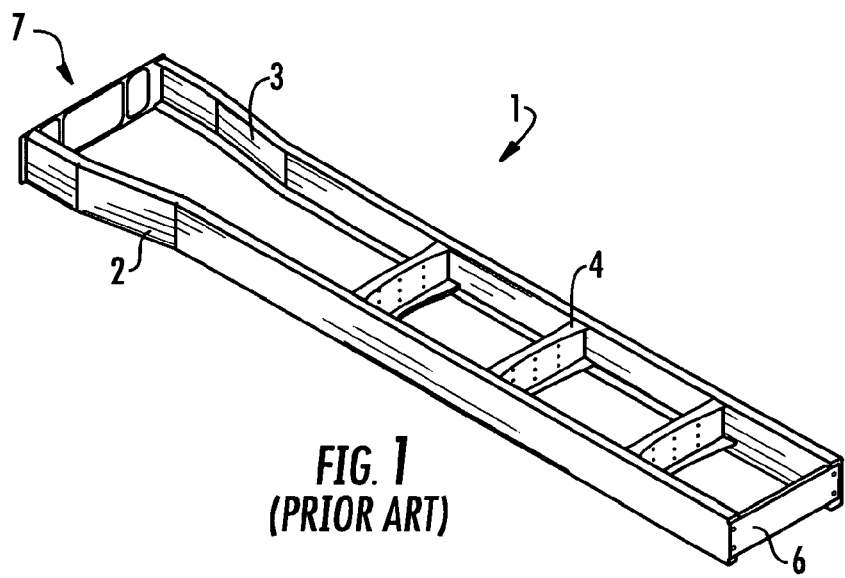
FIG. 1 is a perspective view of a heavy truck frame according to the prior art.

A conventional frame 1 for a heavy truck is shown in perspective view in FIG. 1. The frame 1 is formed of two frame rails 2, 3 joined by cross members 4 (three cross members are shown) and end cross member 6 to form a rigid, weight bearing structure. The frame rails 2, 3 are elongated U-shaped members, typically formed from steel sheet. The frame 1 shown in FIG. 1 has a front end portion 7 where the frame rails are bent to diverge to' enlarge the space therebetween to accommodate a vehicle engine.

The frame 1 is intended to support a number of components which are mounted directly or indirectly to the frame. An engine cradle assembly (not shown in FIG. 1) is mounted at the front end 7 and spans between the frame rails 2, 3. A front bumper assembly may also be mounted to the front ends of the frame rails. In addition, the front ends of the frame rails may also support a radiator mounting assembly. The frame also supports the vehicle axles and suspension, the cab, and the fifth wheel in tractor type trucks.

It would be convenient to redesign the frame itself into component modules that can be selected as needed for the intended end use of the truck and readily brought to the assembly line or station and installed to the frame. For example, a long haul truck frame has different frame needs than does a concrete truck or dump truck, and if the frame is broken down to components or modules, certain frame components may be common to all or some trucks, enabling a modular frame system to be developed.

Further, for components that may need replacement or repair, it would be convenient to have a secure, yet removable joint system for joining such components to the frame. For example, the front bumper may require replacement after a collision.

Figure 2:
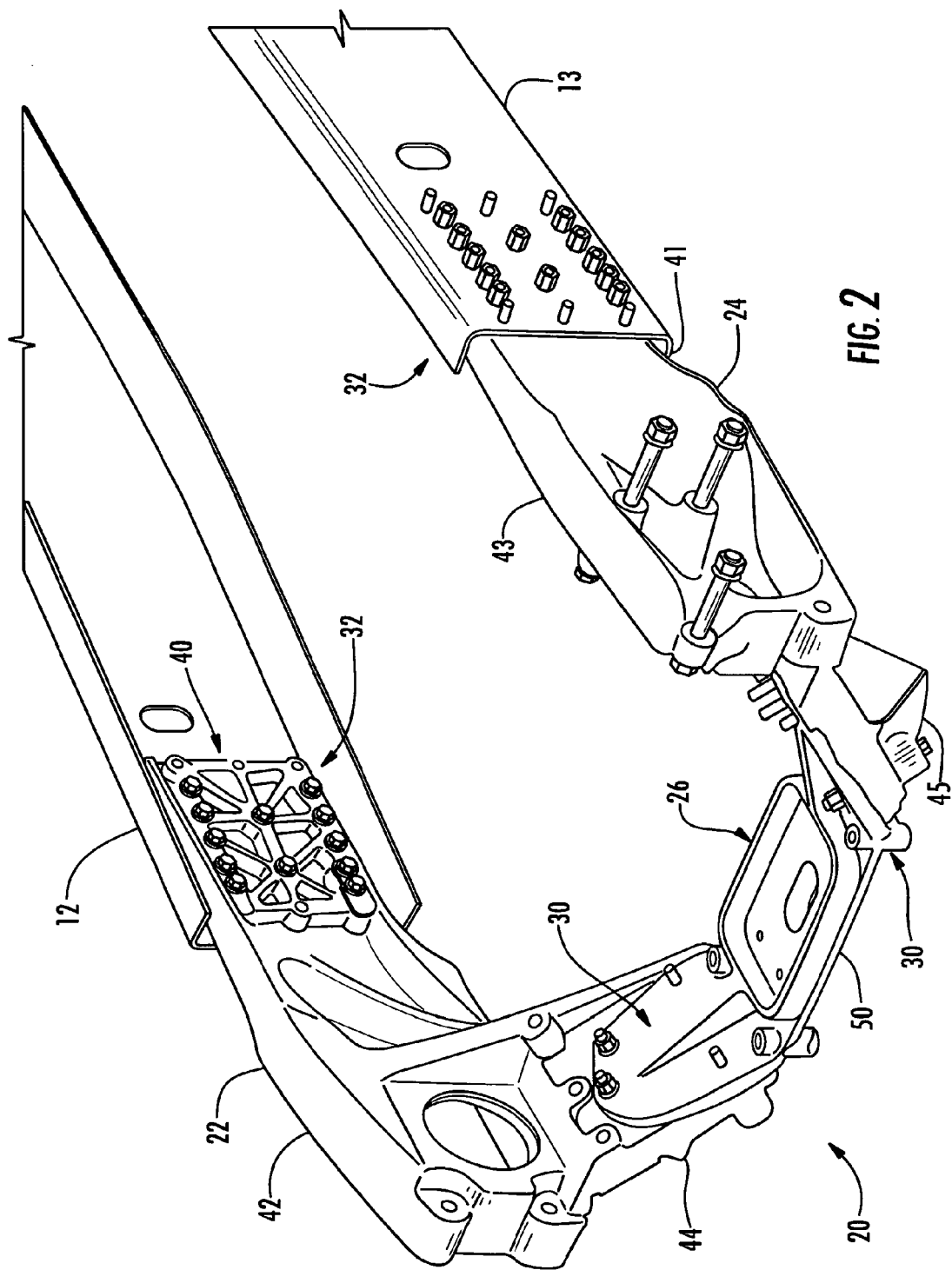
FIG. 2 is a perspective section view showing a front end module attached to a frame with joint structures in accordance with the invention.

FIG. 2 shows in perspective section view a frame having frame rails 12, 13 which are formed as elongated U-shaped channels similar to the frame rails 2, 3 of FIG. 1. The frame rails 12, 13 are arranged in parallel in a longitudinal direction of the vehicle frame. In accordance with the invention, a front end assembly 20 configured with frame arms 22, 24 and an engine support member 26 to support an engine is mounted to the frame at front ends of the frame rails 12, 13.

The invention provides a secure joint for frame components, and which is removable if necessary for repair or replacement. The front end assembly 20 includes frame arms 22, 24 and the engine support member 26. The engine support member 26 is mounted to the frame arms 22, 24 by lap joint assemblies 30, shown in more detail in FIG. 3, and spans transversely between the frame arms. The frame arms 22, 24 are connected to the frame members 12, 13 by way of lap joint assemblies 32, which are shown in greater details in FIGS. 4 and 5.

The frame arms 22, 24 are configured to extend forward of the frame members 12, 13. The frame arms 22, 24 each comprise an interface portion 40, 41 that connects to a respective frame member 12, 13, a longitudinally extending body 42, 43 that extends forward of the interface portion 40, 41, and a downwardly depending and transversely angled leg 44, 45 that connects to the engine support member 26.

The engine support member 26 includes a cradle 50 to support an engine. Flanges 52, 54 extending transversely and upwardly angled from opposite ends of the cradle 50. The flanges 52, 54 connect with the legs 44, 45 of the frame arms 22, 24.

Figure 3:
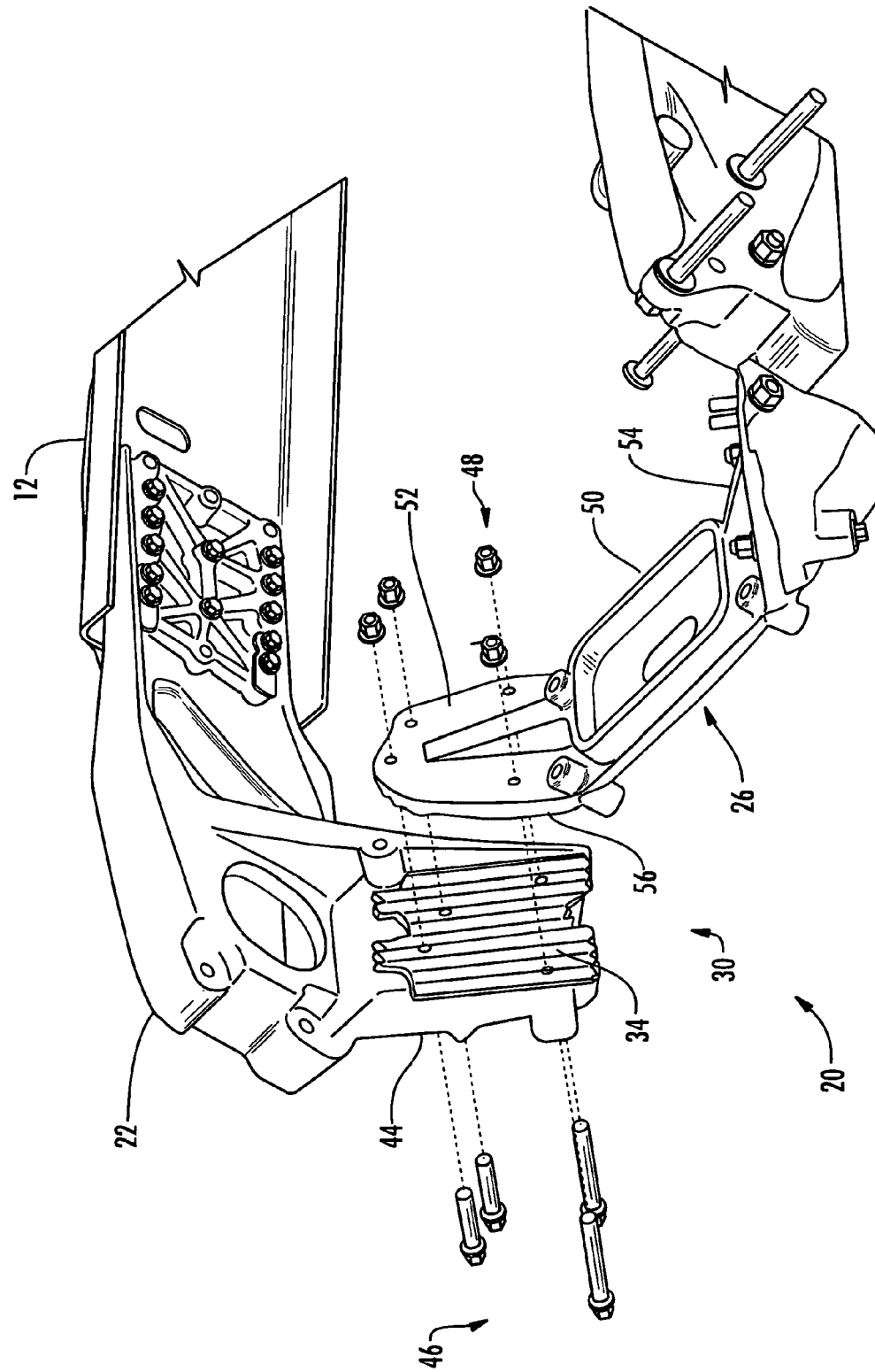
FIG. 3 is an exploded view of a joint structure shown in FIG. 2 connecting the engine support to the front end structure.

Turning to FIG. 3, an exploded view of the lap joint 30 connecting the engine support member 26 to frame arm 22 is shown. It will be understood that the joint connecting the opposite flange 54 of the engine support member 26 to the frame arm 24 is a mirror image of the described lap joint 30. The lap joint 30 includes a first contoured interface surface 34 provided on the leg 44 depending downward from frame arm 22. A second contoured interface surface 56 is provided on the flange 52 of engine support 26.

According to the invention, the contoured interface surfaces 34, 56 are each shaped with a plurality of protrusions and depressions which are arranged to mate and interengage upon assembly of the contoured interface surfaces to form the lap joint 30. In the lap joint 30 shown in FIG. 3, the contoured interface surfaces 34, 56 are embodied as a plurality of parallel grooves and ridges. The contoured interface surfaces are complementary, that is, where the first interface surface 34 has protrusions, the second interface surface 56 has depressions, and vice versa. Upon mating, the interengagement of the protrusions and depressions interface surfaces provides resistance to both linear and torsional shear forces at the mating surfaces. The interengaged surfaces resist relative linear sliding movement and relative rotational sliding movement. According to another aspect of the invention, the contoured interfaces surfaces forming a joint may each be formed of different materials with different hardness values, allowing some deformation of one surface as it engages with the mating surface.

In the illustrated example, the protrusions and depressions are formed as ridges and grooves aligned with the transverse direction of the frame. This arrangement advantageously provides resistance to shear in the longitudinal direction (resisting displacement of the engine support 26 in a fore/aft direction). The arrangement additionally provides improved resistance to forces urging rotation of the flange 52 relative to the leg 44 of the frame arm 22 (resisting relative pivoting of the engine support 26 and the accompanying paralleling of the frame rails), which may occur in vehicle cornering or turning movements. Resistance to paralleling of the frames advantageously improves vehicle roll resistance.

The mating flange 52 and leg 44 are fastened by a plurality of bolts 46 and nuts 48 extending through aligned holes provided in the flange and leg.

Figure 4:
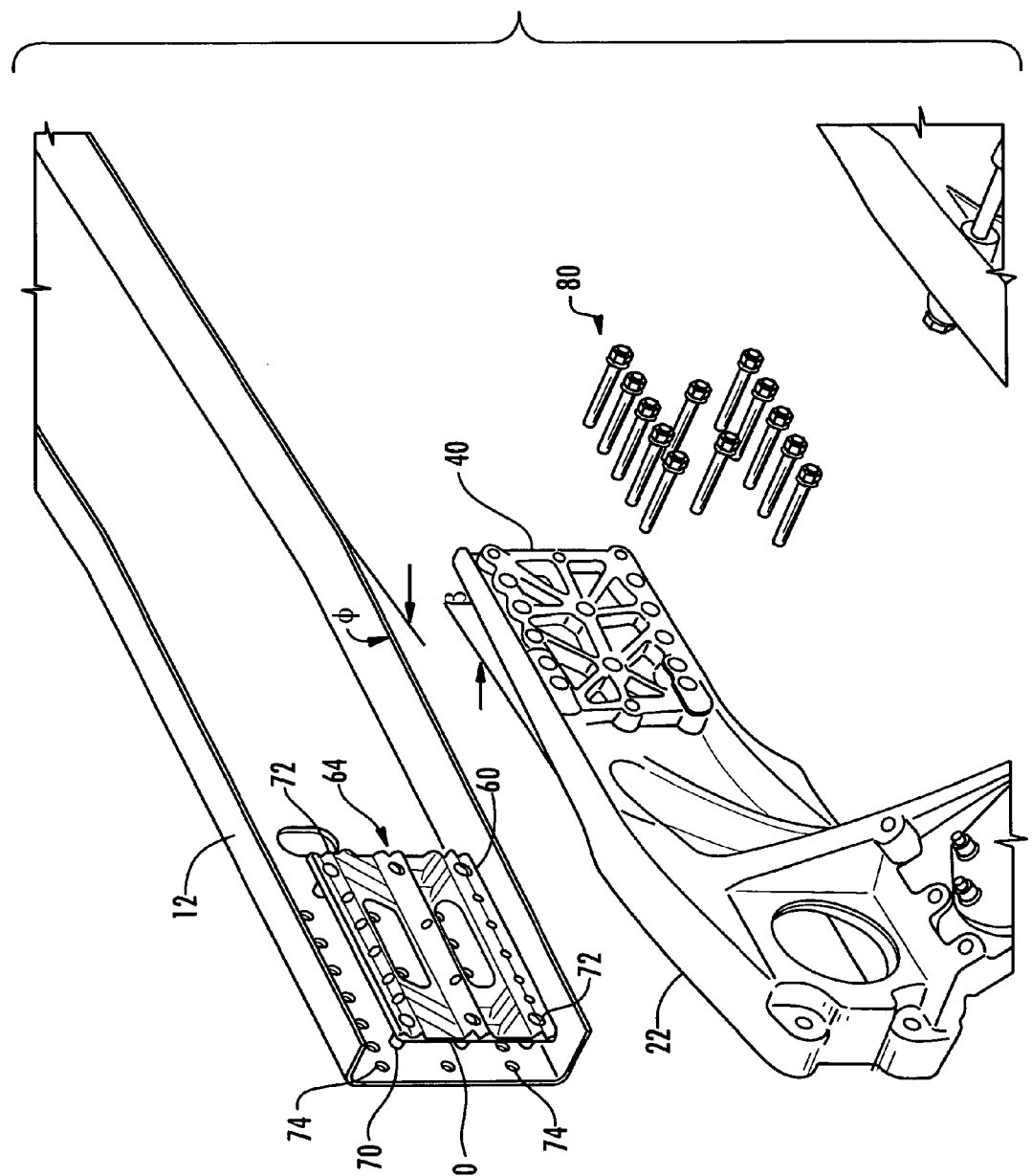
FIG. 4 is an exploded view of a second joint structure in accordance with the invention connecting the front end module to a frame rail by way of an interface plate.
Figure 5:
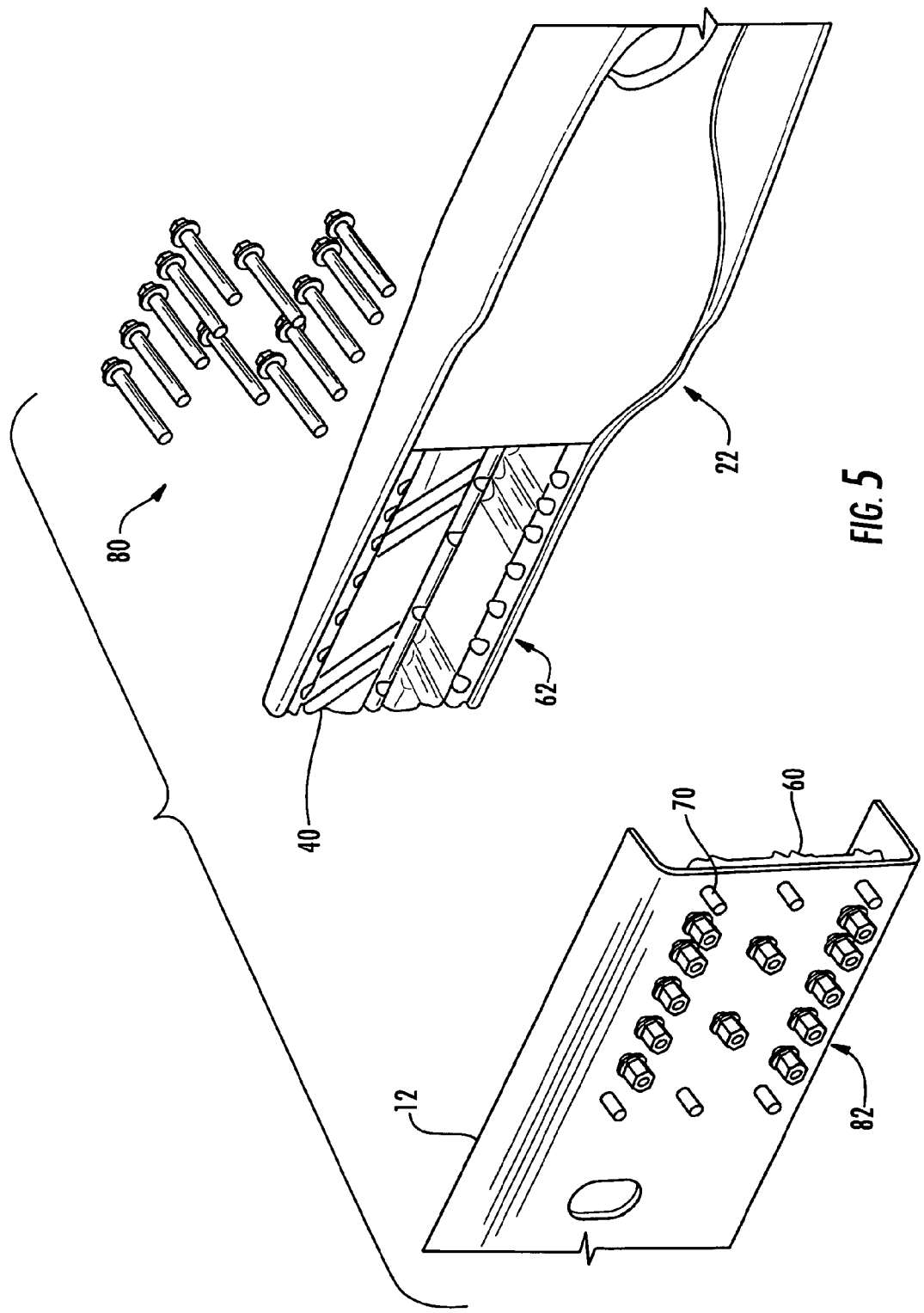
FIG. 5 is an exploded view of the joint structure shown in FIG. 3 from an opposite side.

Turning now to FIG. 4, an exploded view of the lap joint 32 between the arm 22 and the frame rail 12 is shown. The lap joint 32 includes a first contoured interface surface 60 provided on the frame rail 12 and a second contoured interface surface 62 (shown in FIG. 5) provided on the interface 40 of the frame arm 22. The first contoured interface surface 60 and the second contoured interface surface 62 are formed with protrusions and depressions, similar to those of the contoured interfaces 34, 56 of FIG. 3. The contoured interface surface 60 in the illustrated embodiment includes grooves and ridges extending in the longitudinal direction and arranged in groups at the top, center, and bottom portions of the surface 60, and grooves and ridges obliquely oriented arranged in groups between the top and center grooves and ridges and between the center and bottom grooves and ridges. This combination of protrusions and depressions helps resist linear shear in the longitudinal direction and vertical direction, and provides resistance to relative rotation of the interface surfaces. Referring to FIG. 5, it may be seen that the contoured interface surface 62 on the arm 22 is formed in a complementary manner, having grooves to accept the ridges, and ridges to accept the grooves of the contoured interface surface 60 provided on the frame member 12. This arrangement also facilitates aligning and mating the joint members during assembly.

Because the first frame member 12 is made of relatively thin metal sheet on which it may be difficult to form depressions and protrusions, the contoured interface surface 60 is formed on an interface plate 64 which is mounted to the first frame member 12. The interface plate 64 may be mounted to the frame member 12 by rivets 70 as shown. Alternatively, the interface plate 64 may be mounted by bolts and nuts, welding, adhesive, or another suitable permanent or semi-permanent fastening system. A plurality of holes 72 is provided in the interface plate 64 and a second plurality 74 for alignment with the first plurality 72 is provided in the first frame member 12 for the illustrated rivets. Additional holes are provided in the frame member 12 and interface plate 64 for assembling the joint members, as will be described below.

The frame member 22 in the illustrated embodiment is formed as a cast member, and may alternatively be a forged member, allowing the second contoured interface surface 62 to be formed directly on the second frame member 22. However, if the mating frame member is also a relatively thin member, a second interface plate may be provided.

The interface surface 62 of the interface portion 40 shown in FIG. 5 includes spaced groups of grooves and ridges oriented in a longitudinal direction of the frame and a plurality of obliquely oriented ridges and grooves, complementary to the grooves and ridges of the interface surface 60 of the interface plate 64.

When the lap joint 32 is assembled, the interface plate 64 is secured to the frame member 12 by, for example, rivets 70, as mentioned above. The second frame member 22 is placed with the second contoured interface surface 62 in mating contact with the first contoured interface surface 60 interengaging the surfaces. A plurality of fasteners, for example, bolts 80 are positioned in aligned holes in the respective second frame member 22, interface plate 64 and first frame member 12, and secured with a respective plurality of nuts 82.

Referring to FIG. 4, it is convenient for installation of the front end assembly 20 to the frame rails 12, 13, to provide for a diverging angle φ from longitudinal in an end portion of the frame rails 12, 13 and a corresponding converging angle β in the frame members 22, 24. This allows the front end assembly 20 to approach the frame rails 12, 13 and positioning of the joint components with full contact only upon complete alignment.

Figure 6:
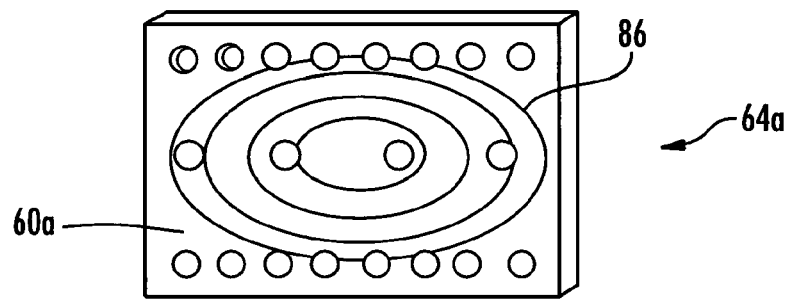
FIG. 6 is a front view of an interface plate of the joint structure according to another embodiment of the invention; and, FIG. 7 is a front view of an interface plate of the joint structure according to yet another embodiment of the invention.

Embodiments of contoured interface surfaces have been illustrated and described in connection with FIGS. 3, 4 and 5. In the case of grooves and ridges, an orientation perpendicular or at least oblique to a direction in which shear forces are expected to act on the joint is believed to be effective. Other forms of protrusions and depressions could be used. FIG. 6 shows an alternative contoured interface surface 60a illustrated, for convenience, on an interface plate 64a. According to this embodiment, a plurality of concentric grooves and ridges 84, circular or non-circular (as shown), are formed on the surface 60a. The concentric grooves and ridges may be in a single group or arranged in a plurality, of groups.

Figure 7:
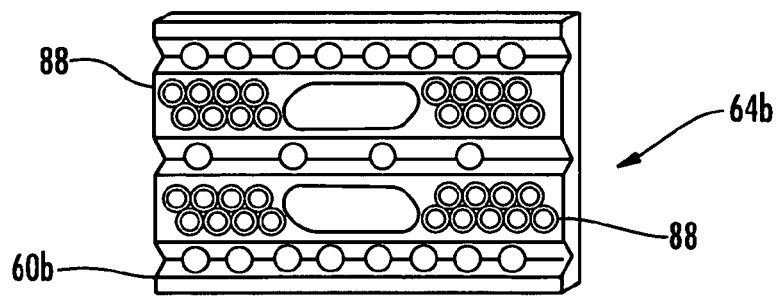

Another embodiment of a contoured interface surface 60b is shown on an interface plate 64b in FIG. 7 and integrated with grooves and ridges similar to those shown in the interface surface 60 of FIG. 4. In this embodiment, a plurality of bumps and cavities 88 are formed on the interface surface 60b.

Structural joints in accordance with the invention were described in the context of an engine support mounted to a front end frame assembly, and a front end assembly mounted to a conventional frame rail 12. However, the joint of the invention can be applied to joining other frame members or components as will be understood by those skilled in the art. As will also be understood, substitutions of equivalents may be made without departing from the scope of the invention as defined in the appended claims.

What is claimed is:

1. A structural joint for frame members in a vehicle, comprising:
   a first frame member;
   an interface plate mounted to the first frame member, the interface plate including a first contoured interface surface provided with at least one protrusion and at least one depression;
   a second frame member forming a lap joint with the first frame member and including a second contoured interface surface provided with at least one protrusion and at least one depression complementarily shaped for interengagement with the at least one protrusion and the at least one depression on the first contoured interface surface; and,
   a plurality of fasteners for fastening the second frame member to the interface plate, wherein, the protrusions and depressions of the first and second contoured interface surfaces resist linear shear forces in a longitudinal direction and a vertical direction and torsional shear forces when interengaged.

2. The structural joint of claim 1, wherein the contoured interface surfaces of the interface plate and the second frame member each includes a plurality of protrusions and depressions.

3. The structural joint of claim 1, wherein the at least one protrusions and the at least one depressions on the first and second contoured interface surfaces comprises a plurality of ridges and grooves obliquely oriented to the longitudinal direction.

4. The structural joint of claim 1, wherein the first contoured interface surface and the second contoured interface surface are formed of different materials provided with different hardness values.

5. The structural joint of claim 1, wherein the at least one protrusion and the at least one depression on the first contoured interface surface are in the form of at least one ridge and the at least one groove that are concentric with respect to each other and the at least one protrusion and at least one depression on the second contoured interface surface are in the form of at least one ridge and at least one groove that are concentric with respect to each other.

6. The structural joint of claim 1, wherein the first contoured interface surface further comprises at least one other protrusion and at least one other depression that are oblique to the at least one protrusion and the at least one depression on the first contoured interface surface and the second contoured interface surface further comprises at least one other protrusion and at least one other depression that are oblique to the at least one protrusion and the at least one depression on the second contoured interface surface.

7. The structural joint of claim 1, wherein the at least one protrusion and the at least one depression on the first contoured interface surface are in the form of at least one ridge and at least one groove, respectively, and the at least one protrusion and the at least one depression on the second contoured interface surface are in the form of at least one groove, respectively.

8. The structural joint of claim 7, wherein the first contoured interface surface further comprises at least one other ridge and at least one other groove that are oblique to the at least one ridge and the at least one groove on the first contoured interface surface and the second contoured interface surface further comprises at least one other ridge and at least one other groove that are oblique to the at least one ridge and the at least one groove on the second contoured interface surface.

9. A structural joint for frame members in a vehicle, comprising:
- a first frame member;
- an interface plate mounted to the first frame member, the interface plate including a first contoured interface surface provided with a longitudinal direction and at least one protrusion and at least one depression oriented obliquely with respect to the longitudinal direction;
- a second frame member forming a lap joint with the first frame member and including a second contoured interface surface provided with a longitudinal direction and at least one protrusion and at least one depression oriented obliquely with respect to the longitudinal direction and complementarily shaped for interengagement with the at least one protrusion and the at least one depression on the interface surface of the interface plate; and
- a plurality of fasteners for fastening the second frame member to the interface plate, wherein, the protrusions and depressions of the first and second contoured interface surfaces resist relative linear sliding movement and relative rotational sliding movement when interengaged.

10. The structural joint of claim 9, wherein the contoured interface surfaces of the interface plate and the second frame member each includes a plurality of protrusions and depressions.

11. The structural joint of claim 9, wherein the first and second contoured interface surfaces are formed of different materials provided with different hardness values.

12. The structural joint of claim 9, wherein the at least one protrusion and the at least one depression on the first contoured interface surface are in the form of at least one ridge and the at least one groove that are concentric with respect to each other and the at least one protrusion and the at least one depression on the second contoured interface surface are in the form of at least one ridge and at least one groove that are concentric with respect to each other.

13. The structural joint of claim 9, wherein the linear sliding movement is in both in the longitudinal direction and a vertical direction.

14. The structural joint of claim 9, wherein the first contoured interface surface further comprises at least one other protrusion and at least one other depression that are oblique to the at least one protrusion and the at least one depression on the first contoured interface surface and the second contoured interface surface further comprises at least one other protrusion and at least one other depression that are oblique to the at least one protrusion and the at least one depression on the second contoured interface surface.

15. The structural joint of claim 9, wherein the at least one protrusion and the at least one depression on the first contoured interface surface are in the form of at least one ridge and at least one groove, respectively, and the at least one protrusion and the at least one depression on the second contoured interface surface of the second frame member are in the form of at least one ridge and at least one groove, respectively.

16. The structural joint of claim 15, wherein the first contoured interface surface further comprises at least one other ridge and at least one other groove that are oblique to the at least one ridge and the at least one groove on the first contoured interface surface and the second contoured interface surface further comprises at least one other ridge and at least one other groove that are oblique to the at least one ridge and the at least one groove on the second contoured interface surface.

* * * * *